Patented Oct. 6, 1936

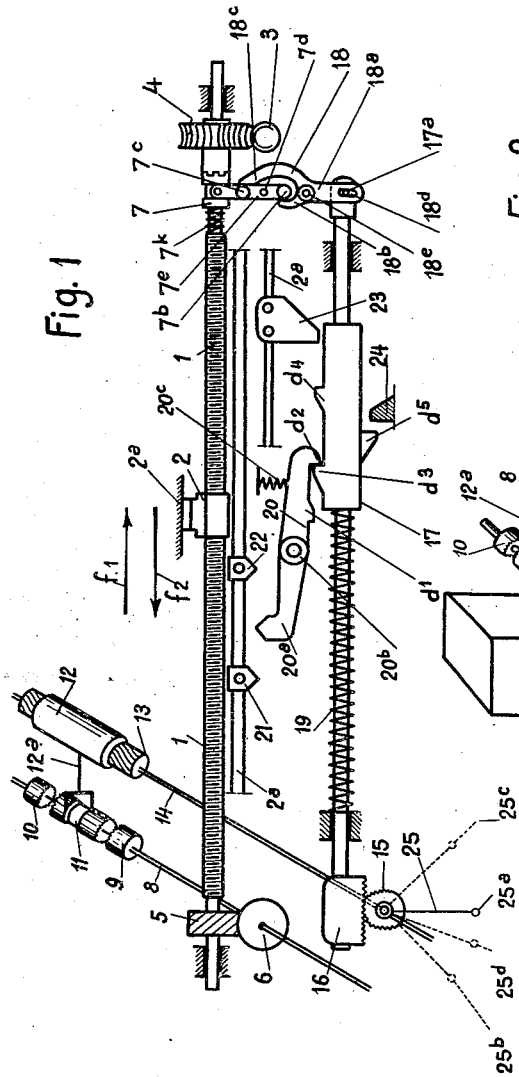

2,056,741

UNITED STATES PATENT OFFICE 2,056,741

DRIVE FOR MACHINE TOOL TABLES OR CARRIAGES

Fernand Alfred Rouchaud, Limoges, France, assignor to Societe Anonyme Etablissements Rouchaud & Lamassiaude, Limoges, France Application August 8, 1935, Serial No. 35,243
In France August 11, 1934

12 Claims. (Cl. 74—59)

This invention relates to machine tools such as milling machines for metal, wood or other materials, and has more particular reference to machine tools comprising a table or carriage fed in either directions by a screw or like threaded member.

The primary object of the invention is to provide for machine tools of the aforesaid type an improved drive permitting the quick feed or travel in both directions and at the will of the operator of the table or carriage so as to perform its quick and automatic feed for bringing the work towards or away from the tool or conversely.

A further object of the invention is to provide for such machine tools an improved drive permitting the automatic de-clutching of the quick feed motion of the work and tool towards each other and the automatic clutching up of a slow working feed motion as well as the automatic de-clutching of said slow feed motion.

A still further object of the invention is to provide for such machine tools an improved drive permitting the automatic quick return of the table or carriage to its original starting position and the automatic stoppage of the table or carriage at said position, said drive also permitting the table or carriage to be automatically brought to a still position after de-clutching of the slow-feed motion.

Still another object of the invention is to provide for use in machine tools such as milling machines of the aforesaid type an improved drive comprising a minimum number of simple and rugged parts, cheap to manufacture and assemble, not liable to undue wear or disorder and requiring no skilled labor for its proper operation and supervision.

With these and such other objects in view as will incidentally appear hereinafter, the invention comprises the novel construction, combination and arrangement of parts that will be more fully described with reference to the accompanying diagrammatic drawing illustrating convenient constructional forms and forming a part of the present disclosure.

In the drawing:

Figure 1 is a diagrammatic illustration of a first constructional form of the improved drive according to the invention, as applied to a machine tool such as a milling machine comprising a movable table or carriage.

Figure 2 is a diagrammatic illustration somewhat in perspective of another constructional form of this improved drive.

Like reference characters designate like parts throughout the two views, for the sake of clearness.

Reference being first had to Figure 1, it will be seen that the machine comprises as usual a screw 1 fitted with a nut 2 for driving longitudinally or "feeding" a table or carriage 2a. The screw 1 may be rotated in the one or the other direction, at slow or quick speed, as will appear hereafter. The rate of the slow speed may be varied as usual to suit the work to be performed.

Means are provided according to the invention whereby the slow rotation and the quick rotation that must be imparted to the screw 1 to meet the operative requirements of the machine cannot be caused simultaneously, the slow drive means for the screw 1 being clutched while the quick drive means are declutched or vice versa.

In the embodiment illustrated, the slow drive is imparted to the screw 1 by a worm 3 and a worm wheel 4. The quick drive is imparted to the screw 1 by a worm gear 5, 6 the gearing ratio of which is different from that of the worm gear 3, 4. These two drives are located at the respective ends of the screw 1 but they might of course occupy different positions with respect to the screw. The worm wheel 4 is mounted idly on the screw 1; it can be connected up to said screw through the medium of a sliding dog 7 urged by a spring 7k. The worm wheel 5 is permanently keyed or otherwise rigidly fastened to the screw 1.

The worm 3 is connected to known means, forming as such no part of the invention, for driving it in either direction. Such means may be for instance a gear case of any suitable type such as the one designated by C in Figure 2. The worm 3 and worm wheel 4 can be driven in either direction from the gear case C. The table or carriage 2a may thus be fed at the required speed in both directions, depending on the nature of the work or operation to be performed.

The worm 6 is secured to a shaft 8 about which are rotatably driven in reverse directions, by any suitable power source such as P (Fig. 2) two dogs 9, 10 mounted idly on said shaft. A sliding dog 11 is splined to the shaft 8 so as to rotate it in the one or the other direction depending on its being in engagement with the driving dog 9 or with the driving dog 10.

A clutch bar 17 disposed parallel or substantially parallel to the screw 1 is connected by suitable means to the dog 11 so that by shifting the dog 11 (either manually, or by the foot or otherwise) the bar 17 is at the same time imparted a movement of translation. Conversely, if the bar 17 is imparted a motion, it shifts the dog 11 in the one or the other direction according to its own direction of displacement.

In the embodiment illustrated, the motion of the dog 11 along the shaft 8 is performed by a fork 12a secured to a sharp pitch nut 12 which is shifted by the rotation of a corresponding worm 13 driven by a shaft 14 on which is mounted a toothed pinion or sector 15. The latter meshes with a rack 16 connected to the end of the bar 17. Any rotation of the pinion 15 causes simultaneous displacement of the dog 11 and bar 17. An actuator 25 in the form of a hand lever is connected to the pinion or sector 15. The parts 12, 12a, 13, 14, 15, 25 form a reversing gear which permits to change the direction of rotation of the quick drive means comprising the parts 8, 9, 10, 11.

A connection is provided between the bar 17 and the dog 7. This connection is constituted in the embodiment shown in Figure 1 by a lever 18 pivoted at 18e and comprising three arms 18a, 18b, 18c. The arm 18a has an elongated slot 18d into which is engaged a stud 17a connected to the bar 17. The arms 18b and 18c are so disposed as to act on shanks 7b and 7c of a fork pivoted at 7d; therefore, the displacement of the clutch bar 17 in the one or the other direction is capable of causing the worm wheel 4 to be de-clutched from the screw 1.

Clutching of the worm wheel 4 is permitted exclusively in the middle position of the clutch bar 17, as shown in the accompanying drawing. As illustrated, the dog 7 which is then subjected to the action of the spring 7k in the direction shown by the arrow $f^1$ is clutched up to the worm wheel 4 which can thus drive the screw 1.

A spring 19 or any equivalent elastic device tends to constantly shift the clutch bar 17 in the direction shown by the arrow $f^1$. A rocker 20 is pivoted at 20b intermediate the screw 1 and clutch bar 17. Said rocker is provided with two teeth $d^1$ and $d^2$ which can engage with a tooth $d^3$ on the bar 17. Stops 21, 22, 23 are secured to the table or carriage 2a of the machine tool and may be adjusted in position according to the length of the milling or other operations to be effected. A removable abutment 24 is provided for limiting, in combination with a tooth $d^5$ on the bar 17, the displacement of said bar when the latter, urged by the spring 19, tends to move in the direction shown by the arrow $f^1$.

The drawing represents the mechanism in the position that it occupies when the machine works or operates in the direction shown by the arrow $f^1$ that is to say when the table or carriage 2a moves in the direction of said arrow. The slow drive means are then clutched up, the dog 7 being in engagement with the worm wheel 4 while the quick drive means are out of clutch since the dog 11 engages neither with the driving dog 9 nor with the driving dog 10. The tooth $d^2$ on the rocker 20 is in engagement with the tooth $d^3$ on the bar 17, and the hand lever 25 occupies the 25a position.

When the working operation is completed, the stop 21 on the table or carriage 2a abuts the bill-shaped end 20a of the rocker 20 which rocks and frees the bar 17. The latter then escapes the rocker and is moved in the direction of the arrow $f^1$ by the spring 19.

The motion of the bar 17 in the $f^1$ direction de-clutches the worm wheel 4 and therefore the slow drive means while simultaneously clutching up the dog 11 to the dog 10 through the medium of the rack 16, pinion 15, shaft 14, worm 13 and sharp pitch nut 12. The hand lever or actuator 25 then occupies the 25b position.

The screw 1 is then driven at high speed in a direction reverse to that of the slow feed, which causes the table or carriage 2a to be quickly fed back in the direction shown by the arrow $f^2$ until the stop 23 engages the tooth $d^4$ on the bar 17 and shifts the latter in the direction shown by the arrow $f^2$, which de-clutches the dog 11 from the dog 10. The table or carriage 2a is then automatically brought to a standstill, the hand lever 25 being at 25d, for which position the slow drive worm wheel 4 is also de-clutched.

During this quick return motion, the stops 21, 22 carried by the table or carriage 2a move in the direction shown by the arrow $f^2$ and thus reach positions on the left hand side of the upper end 20a of the rocker 20.

In order to cause the carriage 2a to be quickly fed towards its working position, the hand lever 25 is brought to the 25c position, which shifts the clutch bar 17 in the direction shown by the arrow $f^2$, whereby the tooth $d^1$ on the rocker 20 engages with the tooth $d^3$ on the bar 17. The slow feed dog 7 is then still de-clutched while the dog 11 engages with the dog 9 which, as above stated, rotates in a direction reverse of that of the dog 10. Therefore the table or carriage 2a is moved rapidly in the direction shown by the arrow $f^1$.

The automatic passing of the quick feed to the slow feed or working feed is performed by the stop 22 which, by pivoting the rocker 20, clears the tooth $d^1$ so that the clutch bar 17 is temporarily freed. Under the influence of the spring 19, the bar 17 then moves rapidly in the direction shown by the arrow $f^1$ till its tooth $d^3$ abuts the tooth $d^2$ on the rocker 20.

The entire mechanism then resumes the middle position as shown, whereupon the steps can follow one another in the aforesaid sequence, the quick drive means being de-clutched while the slow drive means are again clutched up, the bar 17 occupying the middle position.

The removable abutment 24 may be so disposed that the clutch bar 17 resumes a position corresponding to the 25d position of the hand lever 25 so that such displacement should be sufficient for de-clutching the slow drive means without clutching up the quick drive means which would cause quick back feed. This position corresponds to a work which may necessitate for example the traverse of the table or carriage 2a or a work for which it is desired to slowly feed the table or carriage in a direction reverse to the usual slow feed direction.

Reference being now had to Figure 2 which shows a modified constructional form of the improved drive according to the invention, it will be seen that the general construction is the same as in Figure 1. The corresponding parts are designated by like reference characters but are shown somewhat in perspective for the sake of clearness.

The shape of the clutch bar 17 having spaced abutments and the shape of the rocker 20 urged by a spring 20c into a position engaging the tooth $d^3$ on the bar 17 are substantially the same as in Figure 1.

The main difference between Figures 1 and 2 resides in a modification of the pivotal connection between the clutch bar 17 and the dog clutch 7 associated with the slow drive means comprising the worm gear 3, 4 actuated from a conventional gear case C.

In Figure 2, the dog clutch 7 is carried by a fork 18 secured to a cranked rod 30 fitted at its free end with a roller 31 co-operating with the lower face of the clutch bar 17 which has a depression defined between a pair of diverging ramps 32, 33. In the position shown in the drawing, the slow drive means are clutched up but de-clutching takes place when the bar 17 moves so as to expel the roller 31 out of the depression defined between the ramps 32, 33.

The general operation of the drive takes place as described with reference to Figure 1.

The constructional details might vary of course without departing from the scope of the subjoined claims.

What is claimed is:

1. A drive for a machine tool table or carriage fed by a revoluble screw, comprising means for slowly driving the screw in either directions, means for quickly driving the screw in either directions, a gear for operating and reversing the quick drive, an actuator for operating and adjusting the gear at will, clutching means connected to the actuator and slow drive means and movable endwise in two opposite directions independently of the rotation of the screw for rendering the slow drive means operative and the quick drive means simultaneously inoperative or conversely according to its direction of motion, abutments on said clutching means, a member displaceable to co-operate with said abutments, and stops on the table or carriage co-operating with said member and abutments responsive to relative motion of the screw and clutching means.

2. A drive for a machine tool table or carriage fed by a revoluble screw, comprising means for slowly driving the screw in both directions, means for quickly driving the screw in both directions, a gear for operating and reversing the quick drive, an actuator for operating and adjusting the gear at will, clutching means connected to the actuator and slow drive means, said clutching means being urged elastically in one direction and movable endwise in two opposite directions independently of the rotation of the screw for rendering the slow drive means operative and the quick drive means simultaneously inoperative or conversely according to its direction of motion, said clutching means having spaced abutments, a member displaceable to co-operate with said abutments, and stops on the table or carriage co-operating with said member and abutments responsive to relative motion of the screw and clutching means.

3. A drive for a machine tool table or carriage fed by a revoluble screw, comprising means for slowly driving the screw in both directions, means for quickly driving the screw in both directions, a gear for operating and reversing the quick drive, an actuator for operating and adjusting the gear at will, a spring-urged clutch connected to the actuator and slow drive means and movable endwise in two opposite directions independently of the rotation of the screw for clutching the slow drive means while de-clutching the quick drive means or conversely depending on its direction of motion, said clutch having spaced abutments, a member located intermediate the screw and clutch and pivotable to co-operate with said abutments, and stops on the table or carriage co-operating with said member and abutments responsive to relative motion of the screw and clutch.

4. A drive for a machine tool table or carriage fed by a revoluble screw, comprising means for slowly driving the screw in both directions, means for quickly driving the screw in both directions, a gear for operating and reversing the quick drive, an actuator for operating and adjusting at will said gear, a spring-urged clutch connected to the actuator and slow drive means and moveable endwise in two opposite directions independently of the rotation of the screw for clutching the slow drive means while de-clutching the quick drive means or conversely depending on its direction of motion, said clutch having spaced abutments, a rocker pivotable between the screw and clutch to engage said abutments, and adjustable stops on the table or carriage co-operating with said rocker and abutments responsive to relative motion of the screw and clutch.

5. A drive for a machine tool table or carriage fed by a revoluble screw, comprising means for slowly driving the screw in both directions, means for quickly driving the screw in both directions, a gear for operating and reversing the quick drive, an actuator for operating and adjusting at will said gear, a clutch connected to the actuator and slow drive means and movable endwise in two opposite directions independently of the rotation of the screw, said clutch being urged elastically in one direction and capable of clutching the slow drive means while de-clutching the quick drive means or conversely depending on its direction of motion, spaced abutments on said clutch, a rocker co-operating with said abutments, and adjustable stops on the table or carriage engaging the rocker and clutch abutments responsive to relative motion of the screw and clutch.

6. A drive for a machine tool table or carriage fed by a revoluble screw, comprising means for slowly driving the screw in either direction, means for quickly driving the screw in either directions, a gear for operating and reversing the quick drive, an actuator for operating and adjusting at will said gear, a clutch bar connected to the actuator and slow drive means and movable endwise in two opposite directions parallel to but independently of the screw, said clutch bar being spring-urged in one direction and capable of clutching the slow drive means while de-clutching the quick drive means or conversely depending on its direction of motion, spaced abutments on said clutch bar, a spring-urged rocker pivotable between the screw and clutch and so shaped as to co-operate with said abutments, and adjustable stops on the table or carriage engaging the rocker and abutments responsive to relative motion of the screw and clutch bar.

7. A drive for a machine tool table or carriage fed by a revoluble screw, comprising means for slowly driving the screw in either direction, means for quickly driving the screw in either directions, a gear for operating and reversing the quick drive, a hand lever actuator for operating and adjusting at will said gear, a clutch bar rigidly connected at one end to the actuator and pivoted at the opposite end to the slow drive means and movable parallel to but independently of the screw in two opposite directions endwise, said clutch bar being spring-urged towards the slow drive means and capable of clutching the last-named means while de-clutching the quick drive means or conversely depending on its direction of motion, spaced abutments on said clutch bar, a rocker pivotable between the screw and clutch bar and so shaped as to co-operate with said abutments, and adjustable stops on the table or carriage engaging the rocker and abutments responsive to relative motion of the screw and clutch bar.

8. A drive for a machine tool table or carriage fed by a revoluble screw, comprising a worm gear and dog clutch on one end of the screw and means for slowly driving said worm gear in either directions, means on the opposite end of the screw for imparting a quick drive thereto in either directions, a gear for operating and changing the direction of the quick drive, a hand lever actuator for operating and adjusting at will said reversing gear, a clutch bar rigidly connected at one end to the actuator and pivoted at the opposite end to the dog clutch, said bar being spring-urged towards the worm gear and movable parallel to but independently of the screw in two opposite directions endwise for clutching the dog clutch while de-clutching the quick drive means or conversely depending on its direction of motion, spaced abutments on said clutch bar, a rocker so shaped as to co-operate with said abutments, and adjustable stops on the table or carriage engaging the rocker and abutments responsive to relative motion of the screw and clutch bar.

9. A drive for a machine tool table or carriage fed by a revoluble screw, comprising means for slowly driving the screw in either directions, means for quickly driving the screw in either directions, a gear for operating and reversing the quick drive, a rack and pinion actuator for operating and adjusting at will said gear, a spring-urged clutch bar connected at one end to the actuator rack and at its opposite end to the slow drive means, said bar being movable rectilinearly in two opposite directions, and independently of the rotation of the screw for clutching the slow drive means while de-clutching the quick drive means through said gear or conversely depending on its direction of rectilinear motion, spaced abutments on said clutch bar, a rocker interposed between the screw and bar and so shaped as to co-operate with said abutments, and adjustable stops on the table or carriage for engaging the rocker and abutments responsive to relative motion of the screw and clutch bar.

10. A drive for a machine tool table or carriage fed by a revoluble screw, comprising a worm gear and dog clutch on one end of the screw and means for slowly driving the screw in either directions through said clutch and gear, a worm gear on the opposite end of the screw for imparting a quick drive thereto in either directions, a gear for operating and reversing at will the rotation of the quick drive worm gear, a hand lever actuator associated with the reversing gear and carrying a pinion meshing with a rack, a clutch bar connected at one end to said rack and pivoted at its opposite end to said dog clutch, said bar being urged elastically towards the dog clutch and movable in two opposite rectilinear directions parallel to but independently of the screw for clutching the dog clutch while bringing the reversing gear to de-clutching position or conversely depending on its direction of rectilinear motion, spaced abutments on the clutch bar, a rocker so shaped as to co-operate with said abutments, and ajustable stops on the table or carriage for engaging the rocker and abutments responsive to relative motion of the screw and clutch bar.

11. A drive for a machine tool table or carriage fed by a revoluble screw, comprising a worm gear and dog clutch on one end of the screw for slowly driving the screw in both directions from a gear case, a worm gear on the opposite end of the screw having its worm carried by a shaft splined to a driven dog pinion capable of sliding into engagement with driving dog pinions rotating in opposite directions for quickly driving the screw in either directions, a fork-carrying reversing gear for changing over the driven dog pinion from one driving dog pinion to the other, an actuator associated with the reversing gear, a clutch bar connected at one end to the actuator and connected at the other end to the slow drive dog clutch, said bar being spring-urged in one direction and movable independently of the rotation of the screw in two opposite rectilinear directions for clutching the slow drive dog clutch while bringing the reversing gear to quick drive de-clutching position or conversely depending on the direction of motion of said bar, spaced abutments on the clutch bar, a rocker having teeth for co-operating with said abutments, and adjustable stops on the table or carriage for engaging the rocker teeth and bar abutments responsive to relative motion of the screw and bar.

12. A drive for a machine tool table or carriage fed by a revoluble screw, comprising a worm gear and dog clutch on one end of the screw and means for slowly driving the screw in either directions through said clutch and gear, a worm gear on the opposite end of the screw having its worm carried by a shaft splined to a driven dog pinion slidable into engagement with the one or the other of a pair of driving dog pinions rotating in opposite directions for quickly driving the screw in either directions, a fork-carrying reversing gear for changing over the driven dog pinion from one driving dog pinion to the other, a manually operated actuator associated with the reversing gear, a clutch bar rigidly connected at one end to the actuator and pivotally connected at its other end to the slow drive dog clutch, said bar being spring-urged in one direction and movable in two opposite rectilinear directions parallel to the screw for clutching the slow drive dog clutch while bringing the reversing gear to quick de-clutching position or conversely depending on the direction of motion of said bar, spaced abutment teeth on the clutch bar, a rocker interposed between the screw and bar and having teeth for co-operating with said abutment teeth, a spring for urging the rocker into engagement with the bar, adjustable stops on the table or carriage for engaging the rocker and bar teeth responsive to relative motion of the screw and clutch bar, and an abutment limiting the stroke of the bar towards the slow drive dog clutch.

FERNAND ALFRED ROUCHAUD.